Jan. 30, 1968  A. MERCIER  3,366,245
CENTRIFUGAL SEPARATOR

Filed March 11, 1966  3 Sheets-Sheet 1

*INVENTOR.*
ANDRE MERCIER

BY  *Kurt Kelman*

AGENT

Jan. 30, 1968 A. MERCIER 3,366,245
CENTRIFUGAL SEPARATOR
Filed March 11, 1966 3 Sheets-Sheet 2

INVENTOR.
ANDRE MERCIER

BY *Kurt Kelman*

AGENT

United States Patent Office 3,366,245
Patented Jan. 30, 1968

3,366,245
CENTRIFUGAL SEPARATOR
Andre Mercier, La Madeleine, France, assignor to Societe Fives Lille-Cail, Paris, France
Filed Mar. 11, 1966, Ser. No. 533,482
5 Claims. (Cl. 210—378)

ABSTRACT OF THE DISCLOSURE

A light basket for a centrifugal separator, with an imperforate basket wall, an annular partition dividing the chamber between the stationary separator container and the basket into two compartments, and valve-controlled baffles deflecting liquid discharged from openings in a radially extending terminal wall in a radially outward direction.

---

This invention relates to centrifugal separators, and particularly to an improved separator basket.

Separator baskets, in which a solid is to be separated from a liquid by rentention of the solid on a foraminous filter medium while the liquid passes through the growing cake of solid material and the apertures of the medium, are conventionally provided with an annular axial wall formed with radial perforations therethrough. The filtrate is radially discharged through the perforations of the basket wall.

The basket expands and contracts radially during its normal operation under the centrifugal forces applied. The resulting circumferential stresses are concentrated at the edges of the perforations, and the thickness of a basket wall must be sufficient to withstand the concentrated stresses which may be about three times the average stresses in the basket when good design practice is followed, and to avoid fatigue failure of the basket material.

The inert mass of the basket must be accelerated by the drive motor whenever the separator is started, and the momentum of the basket must be absorbed by brakes whenever the separator is stopped. It is important, therefore, to reduce the mass of the basket to a minimum.

The object of the invention is the provision of a basket for a centrifugal separator which may be made lighter in weight than an otherwise comparable conventional basket so as to permit the use of a smaller drive motor and of lighter brakes, yet is as safe against stresses resulting from centrifugal forces and against metal fatigue as a conventional basket of substantially heavier construction.

A principal feature of the invention is the provision of a solid or imperforate axial basket wall, and of auxiliary devices which permit the basket of the invention to be operated in the same manner as a conventional basket having a perforated wall.

The exact nature of this invention as well as other objects and advantages thereof will be readily apparent from consideration of the following detailed description of a preferred embodiment relating to the annexed drawing in which.

Figure 1:
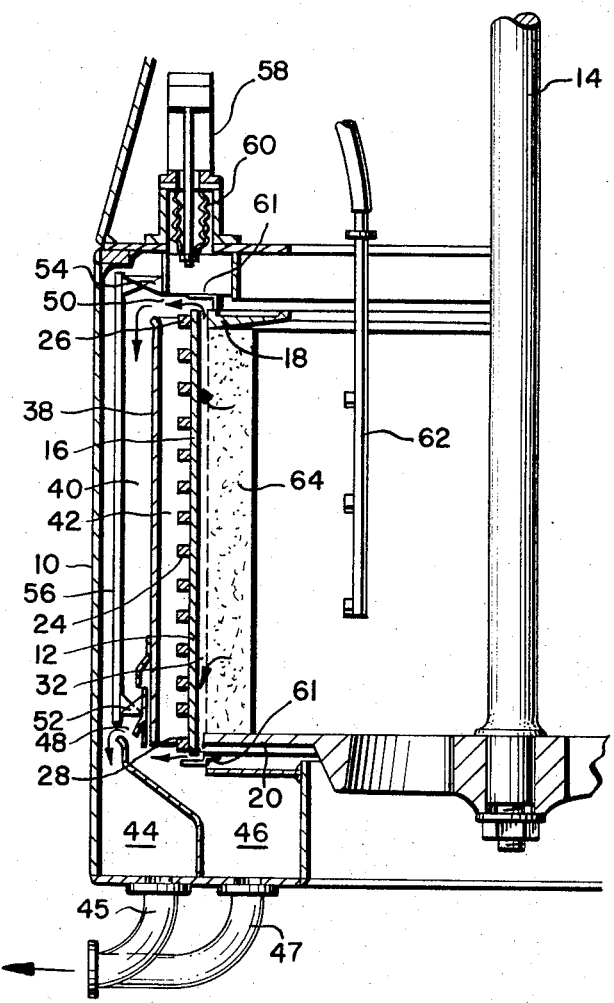
FIG. 1 shows a centrifugal separator of the invention in fragmentary elevational section on its axis of rotation.

Referring now to the drawing in detail, and initially to FIG. 1, there is shown a centrifugal separator which has a stationary, cylindrical outer tank 10 and a basket 12 which is suspended in the tank from a vertical spindle 14 in a conventional manner, not fully illustrated. It will be understood that the spindle 14 transmits rotary movement from a prime mover to the basket 12.

Figure 3:
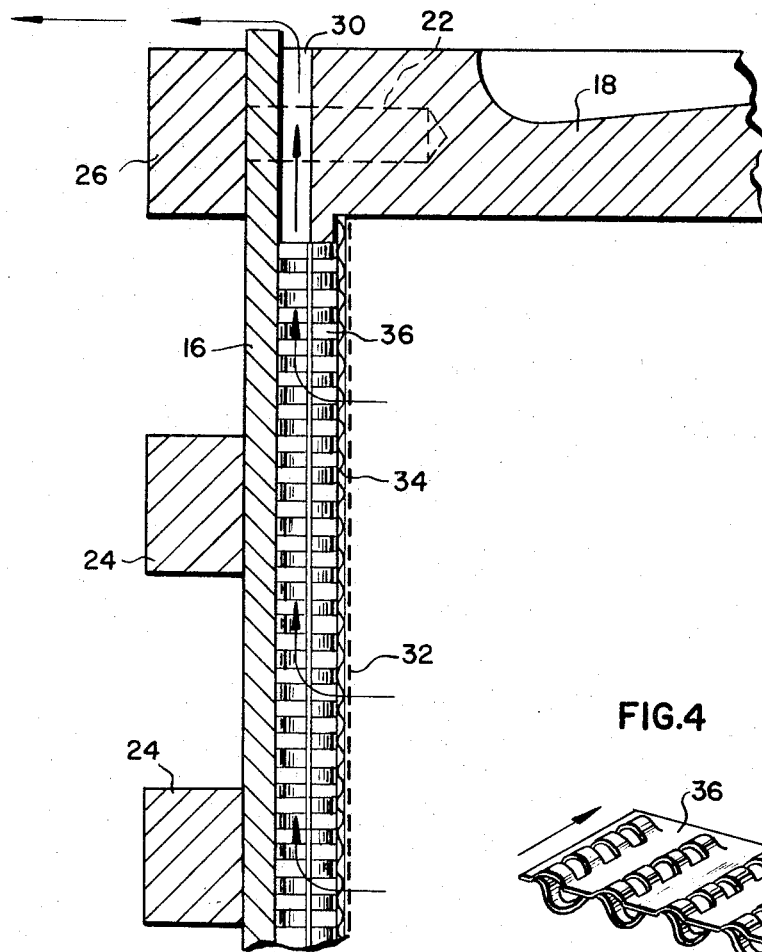
FIG. 3 shows a detail of FIG. 1 on a larger scale.

The basket 12 essentially consists of a practically imperforate, approximately cylindrical axial wall 16 of circular cross section, and of annular top and bottom flanges 18, 20 which constitute the axially terminal walls of the basket. As better seen in FIG. 3, the flanges are conformingly set into the wall 16 and are held in their axial positions by pegs 22 spaced about the circumference of each flange. The pegs 22 pass through radial openings in the wall 16 with a press fit and engage radial openings in the circumferential outer rim of each flange 18, 20. Strengthening rings 24 axially spaced from each other girdle the axial basket wall 16 in a manner known in itself, and the axially terminal rings 26, 28 are located over the pegs 22 so as to retain the same in their positions, and to prevent their radially outward movement from the wall 16. The weight of the basket 12 is transmitted to the spindle 14 by the bottom flange 20.

Figure 2:
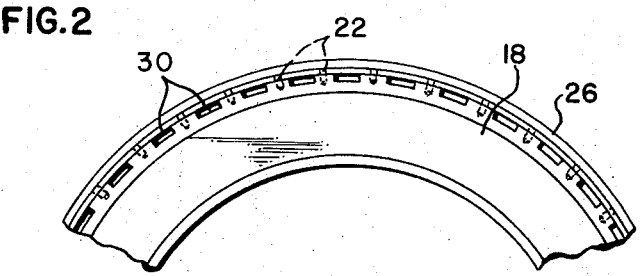
FIG. 2 shows the basket of the separator in fragmentary plan view.

The outer rims of the flanges 18, 20 are radially notched, as best seen in FIG. 2. The notches are closed in a radially outward direction by the inner face of the wall 16, and thus form axial passages 30 through the flanges 18, 20 which are axially aligned with the last-mentioned face (FIG. 3), and provide the sole means of egress for liquid from the rotating basket. The wall 16 is not permeable to liquid. The openings in the wall 16 which receive the pegs 22 are plugged by the latter. These openings are located in a portion of the basket subjected to the least circumferential stresses, and are further reinforced by the rings 26, 28.

Figure 4:
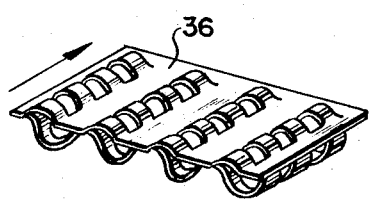
FIG. 4 is a perspective view of a portion of a spacer element used in the separator basket.

The filter medium 32 in the basket is a cylindrical fabric sleeve. It is backed by a more rigid screen 34 of wire netting, and the latter, in turn, is supported by a spacer element 36 of sheet metal having the general shape of a corrugated cylinder. As is evident from joint consideration of FIGS. 3 and 4, the spacer element has axial rows of short circumferential slits. The narrow bands of sheet metal between the slits are alternatingly bent radially outward and radially inward. The spacer element 36 thereby forms a multiplicity of rigid, axially elongated tubes which provide free axial flow channels along the inner face of the basket wall 16, but are transversely open to receive liquid that passes through the filter medium 32 and the screen 33. The flow of liquid through the spacer element 36 and associated structure is indicated by arrows in FIG. 3.

Reverting to FIG. 1, it is seen that the annular chamber between the basket 12 and the tank 10 is radially divided by a partition 38 of generally cylindrical shape into two annular compartments 40, 42. An annular trough at the bottom of the tank 10 is similarly divided into two collecting chambers 44, 46 by a partition vertically aligned with the partition 38. The two partitions may be fixedly fastened to each other in a manner not further illustrated. Discharge pipes 45, 47 lead outwardly from the collecting chambers 44, 46, respectively.

Openings 48 provided between the partition 38 and that dividing the chambers 44, 46 are approximately on a common horizontal level with the bottom flange 20. Similar openings 50 are provided between the top of the partition 38 and the cover of the tank 10, approximately on the level of the top flange 18.

Figure 5:
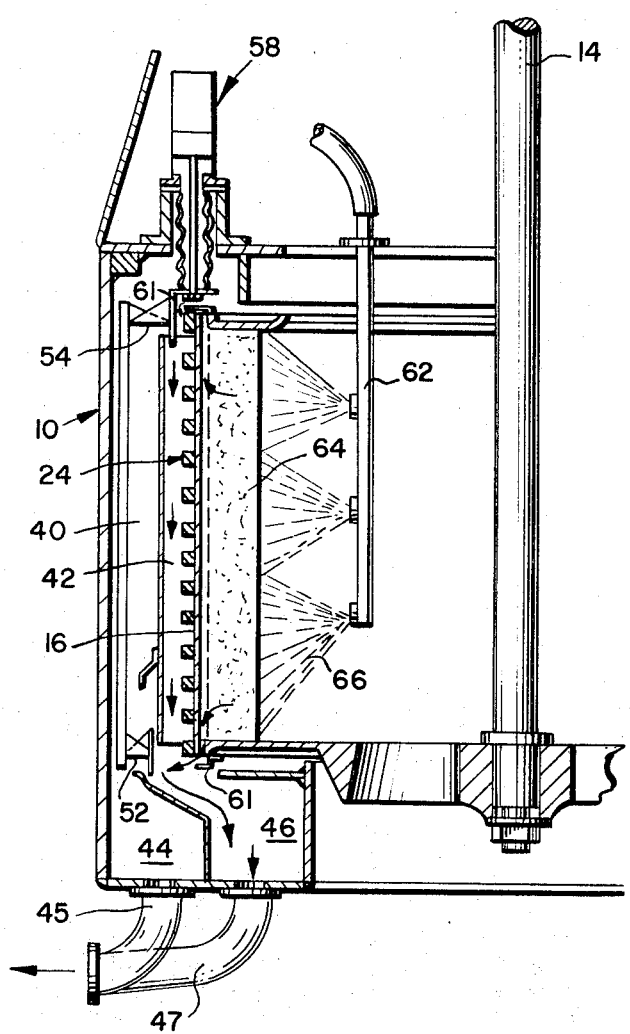
FIG. 5 shows the separator of FIG. 1 in a different operating condition.

Radial flow of fluid through the openings 48, 50 is controlled by a valve assembly consisting essentially of two sheet metal rings 52, 54 axially connected by rods 56, and movable between the position illustrated in FIG. 1 in which the openings 48, 50 are unobstructed, and the position shown in FIG. 5 in which the rings 52, 54 respectively block radial flow through the openings. The valve assembly is suspended from several fluid-pressure operated lifting motors 58 mounted on the tank 10, only one motor being illustrated. Bellows 60 prevent entry of the extracted liquid into the motor 58. Annular baffles 61 arranged over the orifices of the passages 30 deflect the discharged liquid radially outward toward the openings 48, 50.

A manifold pipe 62 extends axially from above into the cavity of the basket 12. It carries several spray nozzles directed against the axial basket wall 16.

The afore-described separator is operated as follows in separating sugar crystals from a mother liquor:

While the rings 52, 54 are in the raised position illustrated in FIG. 1, a slurry of crystals and mother liquor is introduced into the rotating basket 12 in a conventional manner, not illustrated. A cake 64 of crystals is built up whereas most of the mother liquor flows through the channels provided by the spacer element 36 and through the passages 30 axially outward from the basket in both directions. The two streams of liquid are deflected into horizontal sheets by the baffles 61 and pass through the openings 48, 50 into the compartment 40 from which they run downwardly into the collecting chamber 44, and out of the separator through the pipe 45.

When the cake 64 reaches the desired thickness, feeding of slurry to the basket 12 is stopped, and jets 66 of a washing liquid are discharged from the manifold 62 against the cake, as shown in FIG. 5. The washing liquid removes residual, adhering mother liquor from the crystals, but unavoidably dissolves some of the crystalline material. The composition of the washings is sufficiently different from the mother liquor to warrant its being reclaimed separately. The valve assembly 52, 54, 56 is therefore lowered by means of the motor 58 during washing. The liquid discharged through the passages 30 is thereby deflected into the compartment 42 and discharged through the pipe 47.

While axial passages 30 in the top and bottom flanges are preferred for separating slurries containing a relatively high percentage of liquid, it may be entirely adequate to provide such passages and the associated baffle and valve structure on either the top or bottom flange.

Many other modifications and variations of the present invention are obviously possible in the light of the above teachings. It is, therefore, to be understood that, within the scope of the appended claims, the invention may be practiced otherwise than as specifically described.

What is claimed is:
1. A centrifugal separator comprising, in combination:
   (a) a normally stationary container;
   (b) a basket having an axis;
   (c) drive means for rotating said basket in said container about said axis, the basket including
      (1) a substantially imperforate axial wall of circular cross section about said axis;
      (2) spacer means for holding a filter medium at a radial distance from the inner face of said wall during rotation of said basket so as to define a flow channel along said wall;
      (3) two axially spaced terminal walls extending from respective portions of said axial wall in a radially inward direction;
      (4) at least one of said terminal walls being formed with a plurality of openings therethrough communicating with said flow channel; and
      (5) said container and said basket defining therebetween an annular chamber about said axis;
   (d) an annular, axially extending partition dividing said chamber into two annular compartments arranged one inside the other; and
   (e) flow control means for selectively directing a liquid discharged from said openings into one or the other of said compartments, said flow control means including
      (6) baffle means for deflecting liquid discharged from said openings against an annular portion of said partition in a radially outwardly extending direction, said annular portion being formed with an aperture therein; and
      (7) valve means for opening and closing said aperture.

2. A separator as set forth in claim 1, wherein said openings extend axially through said one terminal wall and are axially aligned with said flow channel.

3. A separator as set forth in claim 2, wherein said one terminal wall has an outer circumferential rim engaging said axial wall and is formed with a plurality of circumferentially spaced notches in said rim, said notches constituting said openings.

4. A separator as set forth in claim 1, further comprising a plurality of peg members radially passing through said axial wall and engaging said one terminal wall, and retaining means for preventing radial outward movement of said peg members from said axial wall.

5. A separator as set forth in claim 4, wherein said retaining means include a strengthening ring girdling said axial wall on the level of said peg members.

References Cited

UNITED STATES PATENTS

| | | | |
|---|---|---|---|
| Re. 20,432 | 6/1937 | Roberts | 210—380 |
| 728,737 | 5/1903 | Macfarlane | 210—378 |
| 1,414,526 | 5/1922 | Roberts | 210—215 X |
| 2,312,829 | 3/1943 | Bird et al. | 210—380 X |
| 2,657,803 | 11/1953 | Schutte | 233—2 |
| 3,246,837 | 4/1966 | Douglas | 210—369 X |
| 3,278,037 | 10/1966 | Stelli et al. | 210—382 X |
| 3,282,498 | 11/1966 | Smith | 233—27 |

FOREIGN PATENTS 230,393  3/1925  Great Britain.

REUBEN FRIEDMAN, *Primary Examiner.*

J. L. DE CESARE, *Assistant Examiner.*